United States Patent [19]
Sperling et al.

[11] Patent Number: 5,585,021
[45] Date of Patent: Dec. 17, 1996

[54] CABLE CONNECTION FOR ELECTRIC ARC WELDING OR CUTTING MACHINE

[75] Inventors: Hermann Sperling, Gau Bischofsheim; Klaus Degenhardt, Heuchelheim, both of Germany

[73] Assignee: Alexander Binzel GmbH & Co. KG, Buseck, Germany

[21] Appl. No.: 234,348

[22] Filed: Apr. 28, 1994

[30] Foreign Application Priority Data

Apr. 28, 1993 [DE] Germany ............ 43 13 831.4

[51] Int. Cl.⁶ .................................... B23K 9/32
[52] U.S. Cl. ........................ 219/137.9; 219/136
[58] Field of Search ............... 219/137.9, 136, 219/137.63

[56]  References Cited

U.S. PATENT DOCUMENTS

| 3,924,524 | 12/1975 | Whisler. | |
|---|---|---|---|
| 4,006,524 | 2/1977 | Frank. | |
| 4,049,943 | 9/1977 | Pratt. | |
| 4,544,827 | 10/1985 | Cusick, III | 219/137.9 |

FOREIGN PATENT DOCUMENTS

| 0220090 | 4/1987 | European Pat. Off.. | |
|---|---|---|---|
| 2587258 | 3/1987 | France | 219/137.9 |
| 2033662 | 1/1972 | Germany. | |
| 7517897 | 10/1975 | Germany. | |
| WO9418487 | 8/1994 | WIPO. | |

OTHER PUBLICATIONS

English Language Abstract of SU-A-1-063559A-Dec. 30, 1983-Soviet.

*Primary Examiner*—Clifford C. Shaw
*Attorney, Agent, or Firm*—Price, Heneveld, Cooper, Dewitt & Litton

[57]  ABSTRACT

The cable connection includes a connecting piece connected with an end of a cable for electric arc welding or electric arc cutting. An end piece is joined with the connecting piece while a coupling is joined with the end piece. Thus, a relatively smaller inventory of cables which are provided with connecting pieces may be warehoused and a particular cable may be adapted to an application with a particular electric arc welding machine, electric arc cutting machine, and electric arc tool by selection of the appropriate end piece and coupling to be joined with the connecting piece at each end of the cable.

18 Claims, 1 Drawing Sheet

5,585,021

CABLE CONNECTION FOR ELECTRIC ARC WELDING OR CUTTING MACHINE

BACKGROUND OF THE INVENTION

The invention refers to a connecting element for the connection of electro-water or electro-gas cable of an arc welding or flame cutting machine with a connecting piece to be joined with the cable, and an end piece joined with the same, on whose free end is attached a coupling for fastening of the cable at the burner or machine side of the arc welding or flame cutting machine.

The supply of the arc welding or cutting burner, described in DE-GM 75 17 897, with cooling liquid or gas as well as electric current to produce an arc is achieved by cable, whereby the electro cable is fed through the water or gas hose for cooling. At the ends of the cables are connectors or couplings by which they can be attached to the burner and, at the other end, to the welding machine. The connectors show an insertable connecting piece corresponding with the cable and pressed to the hose by means of an exterior squeeze joint sleeve. Soldered to the connecting piece is an end piece onto which a coupling is attached for fastening at the burner or machine side. The end piece is normally developed as a nipple to mesh with the corresponding counterpart at the burner or the machine. The connecting piece is designed as an overlapping nut or screw by which the cable can be threaded into or out of the corresponding counter thread at the burner or machine side, and thereby be fastened. Since the design of the connecting element can be different at either the burner or machine side, and since among these connecting elements a multitude of systems by manufacturers may prevail, the manufacture of electro-water or electro-gas cables to which, at this time, corresponding connecting elements must be attached, is extremely time consuming. Warehousing of pre-manufactured cables or even hose packages, in which the supply channels of arc welding and cutting burners are combined, is, because of the multitude of connecting systems, yet increased by the number of various conductor cross sections, impaired by great efforts.

Proceeding from here, the invention is based on the problem to develop a connecting element for the connection of electro-water or electro-gas cable of an arc welding or flame cutting machine in such a way as to make it possible for different connecting systems to be mounted to the cable ends in a simple and fast manner.

SUMMARY OF THE INVENTION

For the solution of the problem it is provided, per this invention, that the connecting piece and the end piece are joined by a slip fit. A standard system is created by this invention which can be utilized for all connecting elements, whether at machine or burner side or with internal or exterior thread of the connecting piece. First of all, the connecting piece will be pressed into the corresponding electro-water or electro-gas cable. Depending on the kind of connecting element, the matching end piece will be joined with the connecting piece by its slipped upon coupling and by slip fit. This connection is pressure and water tight and is extremely resistant to tension. Because of the assembly per this invention, when compared to known connections, enormous time savings at assembly and therefore extraordinary cost savings are realized. Also, in a warehouse-technical simple manner, whole standard hose packages in common lengths can be pre-manufactured with connecting pieces at their ends, and then completing the hose package and the previously assembled fastening device by press fitting their connecting and end pieces according to specifications at hand.

In a special design form of this invention, it is provided that the connecting piece shows a somewhat sleeve-like receptacle for the insertion of the end piece. Before press fitting, the end piece, with its end pointing to the cable, is inserted into the receptacle of the connecting piece, whereby after press fitting a secure joint is created.

Preferably, the connecting piece is composed of soft, metallic material, whereby the demanded properties of the connection regarding pressure resistance, water tightness and resistance to tension are improved again.

Therefore, the connecting piece can be of copper or a copper alloy, and the end piece of a brass or brass alloy. Preferably, the connecting piece composed of copper or a copper alloy will be annealed during manufacture in order to provide flow during press fitting and to prevent brittleness.

After further expansion of the invention, the end piece shows preferably circumference encompassing depressions in the area of its end to be inserted into the receptacle of the connecting piece. Such depressions or grooves are especially advantageous in effecting the strength and density of the joint between connecting piece and end piece.

As an alternative per this invention, it is also provided that the end piece shows a somewhat sleeve-like receptacle for the planting upon the end of the connecting piece opposite of the cable, whereby the end piece may be composed of a metallically softer material than the connecting piece like, for instance, annealed copper or copper alloy for the end piece, and brass or a brass alloy for the connecting piece. Likewise, the connecting piece may preferably show depressions in the area of its end to be inserted into the receptacle of the end piece.

Preferably, the end piece is developed as a nipple at its end to be connected to the burner or machine side of the arc welding or flame cutting machine, whereby the nipple presents, at the same time, a limit block for the coupling slipped upon the end piece.

Product examples of the invention are described per the attached drawing.

DESCRIPTION OF THE PREFERRED EMBODIMENTS

Figure 1:
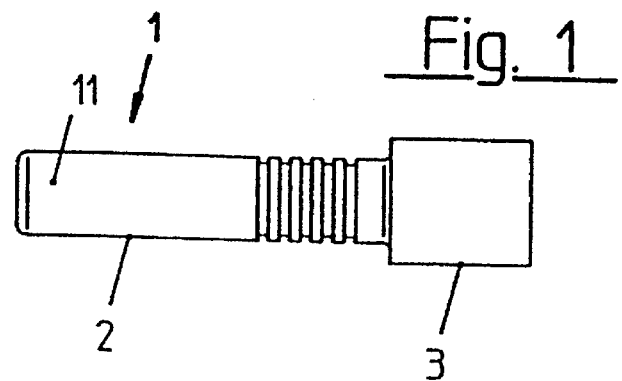
FIG. 1 is a possible product form per the invention of a connecting piece for the connection at an electro-water or electro-gas cable.
Figure 2:
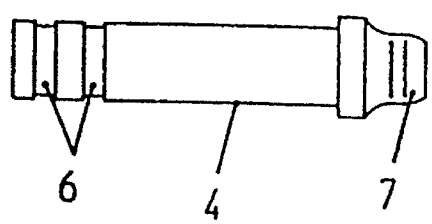
FIG. 2 is an end piece for insertion into a connecting piece per FIG. 1.

The connecting element for an electro-water or electro-gas cable of an arc welding or flame cutting machine presents a connecting piece 1 per FIG. 1 with a shaft 2, which shows a centric bore for the reception of an (not shown) electro cable. The shaft 2 of the connecting piece 1 and the electro cable are press fitted with each other.

Thereby, a longitudinal channel for the cooling liquid or gas flow is produced in the shaft 2. Then, the exterior hose 12 of the electro-water or electro-gas cables 10 are slipped over the shaft 2, and by means of an external squeeze sleeve 13 are press fitted.

Figure 3:
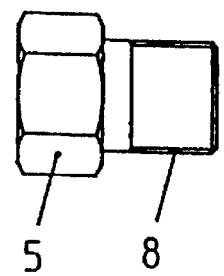
FIG. 3 is a coupling to be slipped upon the end piece per FIG. 2.

Up to this assembly stage, the present cable 10 or even the hose package can be pre-assembled with its supply lines for an arc welder or flame cutter and can be warehoused. Depending on which connecting system is needed, different end pieces 4 and/or couplings 5 can be attached to the connecting piece 1. Thereby, a coupling 5 per FIG. 3 is slipped upon the corresponding end piece 4, and the end piece 4 is inserted into the receptacle 3 of the connecting piece 1.

Figure 4:
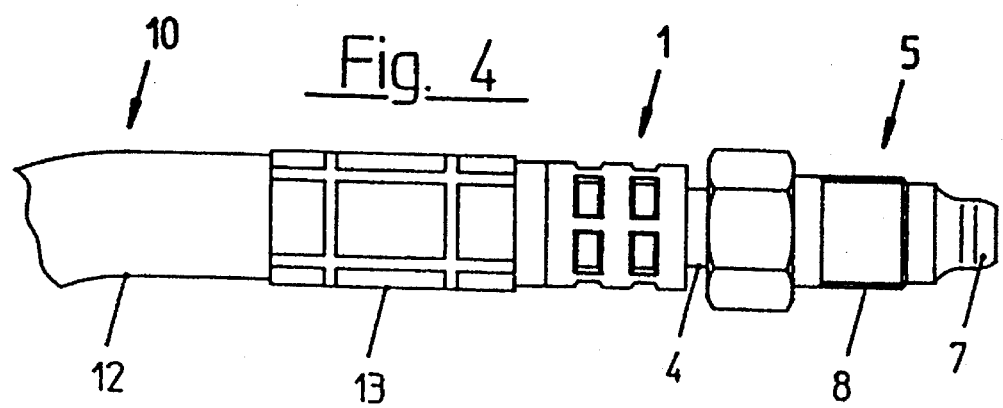
FIG. 4 is the completed connection per FIGS. 1 through 3 at an electro-water or electro-gas cable.

The establishment of the joint between end piece 4 and connecting piece 1 is achieved by press fit, whereby a pressure- and watertight, as well as extremely tension resistant joint is made. Herefore, as can be seen in FIG. 1, the end piece 4 presents circumference encompassing grooves 6 to be received in the area of the receptacle 3. The connection piece is composed of a metallically softer material than the end piece 4, too, for reasons of conducting electric current. Normally, one would produce the connecting piece 1 from annealed copper or a corresponding copper alloy, while the end piece 4 may be composed of brass or a brass alloy. The completed connecting element at an electro-water or electro-gas cable 10 is presented in FIG. 4.

The end piece 4 presents a protrusion 7 in the form of a nipple, which meshes with a corresponding counterpart at the machine or burner side of the arc welding or flame cutting machine and thereby providing a seal simultaneously.

The attachment of the cable 10 at the burner or machine side is made by means of the coupling 5, which, in the here selected example, is developed as an overlapping screw being threaded with an external thread 8 into a corresponding internal thread at the burner or machine side of the arc welding or flame cutting machine. Thereby, the cable 10 is attached, whereby the protrusion 7 in the form of a nipple meshes and seals with the corresponding counterpart at the machine and burner side respectively. Of course, other development of the coupling 5 are possible.

Figure 5:
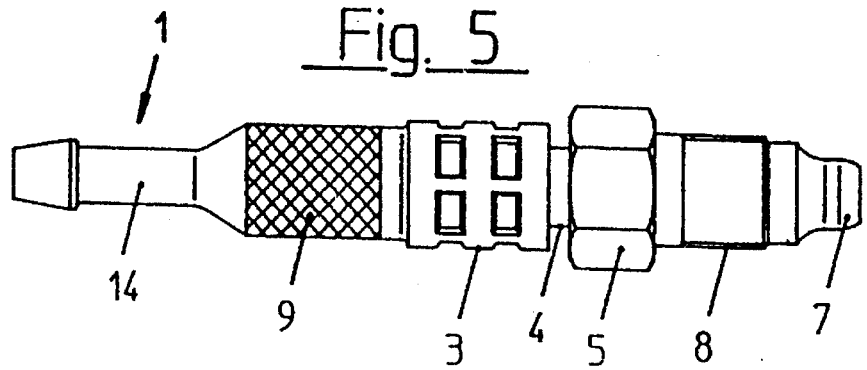
FIG. 5 is a further product form of a connection per this invention.

At the connecting element per FIG. 5 for an electro-gas or electro-water cable, the connecting piece 1 presents a crease-like section 14, unto which the gas or water conducting (not shown) interior hose is slipped. At the in FIG. 1 shown connecting element for a (not shown) coaxial cable, its cords come to join the serrations 9 of the connecting piece 1, whereby a squeeze sleeve slipped unto the coaxial cable presses the copper cords into the serrations 9. At the protruding end of the connecting piece 1 opposite the hose, is again a receptacle 3 for the end piece 4. Seated on the end piece 4 is a coupling 5 in the form of an overlapping screw with external thread 8, whereby at the free end of the end piece 4 again a nipple 7 is formed.

The embodiments of the invention in which an exclusive property or privilege is claimed are defined as follows:

1. Connecting element for the connection of electro-water or electro-gas cable to an arc welding or flame cutting machine, comprising a connecting piece and an end piece, the connecting piece having an end adapted for connection with the cable and an opposing end joined with said end piece, said end piece having an end adapted for connection with the arc welding or flame cutting machine and an opposing end joined with said connecting piece, the connecting piece and the end piece being joined with each other by a press fit.

2. Connecting element per claim 1, wherein the connecting piece includes a sleeve-like receptacle for the insertion of the end piece.

3. Connecting element per claim 1, wherein the connecting piece is composed of metallically softer material than the end piece.

4. Connecting element per claim 1, wherein the connecting piece is composed of annealed copper or an annealed copper alloy, and the end piece is composed of brass or of a brass alloy.

5. Connecting element per claim 1, wherein the end piece includes circumference encompassing depressions in the area of its end to be inserted into the receptacle of the connecting piece.

6. Connecting element per claim 1, wherein the end piece includes a sleeve-like receptacle for receiving a protruding end of the connecting piece.

7. Connecting piece per claim 6, wherein the connecting piece includes circumference encompassing depressions in the area of its end to be inserted into the receptacle of the end piece.

8. Connecting element per claim 1, wherein the end piece is of metallically softer material than that of the connecting piece.

9. Connecting element per claim 1, wherein the end piece is composed of annealed copper or annealed copper alloy, and the connecting piece is of brass or a brass alloy.

10. Connecting element per claim 1, wherein the end piece includes a protrusion in the form of a nipple at its end to be connected to the burner or machine side of the arc welding or flame cutting machine.

11. A cable connection system for an electric arc welding or cutting machine, comprising:
 a connecting piece having a shaft, a receptacle, and a bore, said bore extending at least through said receptacle, said shaft being coupled with a cable of the electric arc welding or cutting machine;
 a cooperating sleeve to fasten said connecting piece together with the cable, said sleeve and said shaft being positioned to at least partially overlap one another with a portion of said cable interposed between said shaft and said sleeve;
 an end piece having a cooperating first end to mate in sealing engagement with said receptacle, said end piece having an opposing second end to mate in sealing engagement with one of a selected electric arc welding tool, a selected electric arc cutting tool, a selected electric arc welding machine, and a selected electric arc cutting machine; and
 a cooperating coupling piece releasaby coupling said second end of said end piece with said one of a selected electric arc welding tool, a selected electric arc cutting tool, a selected electric arc welding machine, and a selected electric arc cutting machine.

12. The cable connection system defined in claim 11, wherein said bore extends coaxially through said shaft and said receptacle.

13. The cable connection system defined in claim 11, wherein said receptacle is formed of a malleable material, wherein said second end of said end piece has an annular shoulder extending outward from said end piece, and wherein said coupling piece has an aperture with an adjacent annular stop surface, said aperture extending through said coupling piece and being sized for slip-fit engagement with said first end of said end piece, so said first end of said end piece is inserted into said aperture of said coupling piece and said coupling piece slides along said end piece to abut said annular stop surface with said annular shoulder, and so said coupling piece couples said second end of said end piece with said one of a selected electric arc welding tool, a selected electric arc cutting tool, a selected electric arc welding machine, and a selected electric arc cutting machine.

14. The cable connection system defined in claim 13, wherein said receptacle is swaged about said first end of said end piece.

15. The cable connection system defined in claim 14, wherein at least one of said receptacle and said end piece has at least one of a circumferential rib or a circumferential groove to enhance the swage connection between said receptacle and said end piece.

16. The cable connection system defined in claim 15, wherein said bore extends coaxially through each of said shaft and said receptacle.

17. The cable connection system defined in claim 11, wherein said receptacle is swaged about said first end of said end piece.

18. The cable connection system defined in claim 17, wherein said receptacle and said end piece have at least one of a circumferential rib or a circumferential groove to enhance the swage connection between said receptacle and said end piece.

* * * * *